(12) United States Patent
Redpath

(10) Patent No.: US 10,962,792 B2
(45) Date of Patent: Mar. 30, 2021

(54) LASER LIGHT STRIPING APPARATUS

(71) Applicant: Richard Redpath, Cary, NC (US)

(72) Inventor: Richard Redpath, Cary, NC (US)

( * ) Notice: Subject to any disclaimer, the term of this patent is extended or adjusted under 35 U.S.C. 154(b) by 172 days.

(21) Appl. No.: 16/132,426

(22) Filed: Sep. 16, 2018

(65) Prior Publication Data

US 2020/0089011 A1   Mar. 19, 2020

(51) Int. Cl.
| | |
|---|---|
| G02B 27/09 | (2006.01) |
| A62B 5/00 | (2006.01) |
| G01B 11/22 | (2006.01) |
| G02B 27/42 | (2006.01) |

(52) U.S. Cl.
CPC ............ *G02B 27/0927* (2013.01); *A62B 5/00* (2013.01); *G01B 11/22* (2013.01); *G02B 27/4233* (2013.01)

(58) Field of Classification Search
CPC .. G02B 27/0927; G02B 27/4233; A62B 5/00; G01B 11/22
See application file for complete search history.

(56) References Cited

U.S. PATENT DOCUMENTS

| | | | | |
|---|---|---|---|---|
| 9,660,410 | B2 * | 5/2017 | Redpath | ................ H01S 3/1055 |
| 2004/0012962 | A1 * | 1/2004 | Wolf | ................... G02B 19/0028 362/259 |
| 2011/0280006 | A1 * | 11/2011 | Redpath | .............. F21V 33/0076 362/101 |
| 2012/0105855 | A1 * | 5/2012 | Miyasaka | ........... G02B 27/4233 356/445 |
| 2012/0165801 | A1 * | 6/2012 | Bragagna | ................. H01S 3/042 606/16 |
| 2014/0362600 | A1 * | 12/2014 | Suckling | .............. G02B 6/4216 362/583 |

FOREIGN PATENT DOCUMENTS

EP     3388871 A1 * 10/2018   ........... G02B 5/1842

* cited by examiner

*Primary Examiner* — Anabel Ton

(57) ABSTRACT

A laser light striping method and apparatus suitable for reading smoke and distance navigation during fire rescue. The laser light striping apparatus comprises at least a laser light emitting element and at least one optical element for creating at least one laser light plane. The method provides an optimized Gaussian distribution profile of power across a laser light plane to avail safe navigation by human in a turbid environment such as smoke/fire during fire rescue and limit blinding by light.

3 Claims, 12 Drawing Sheets

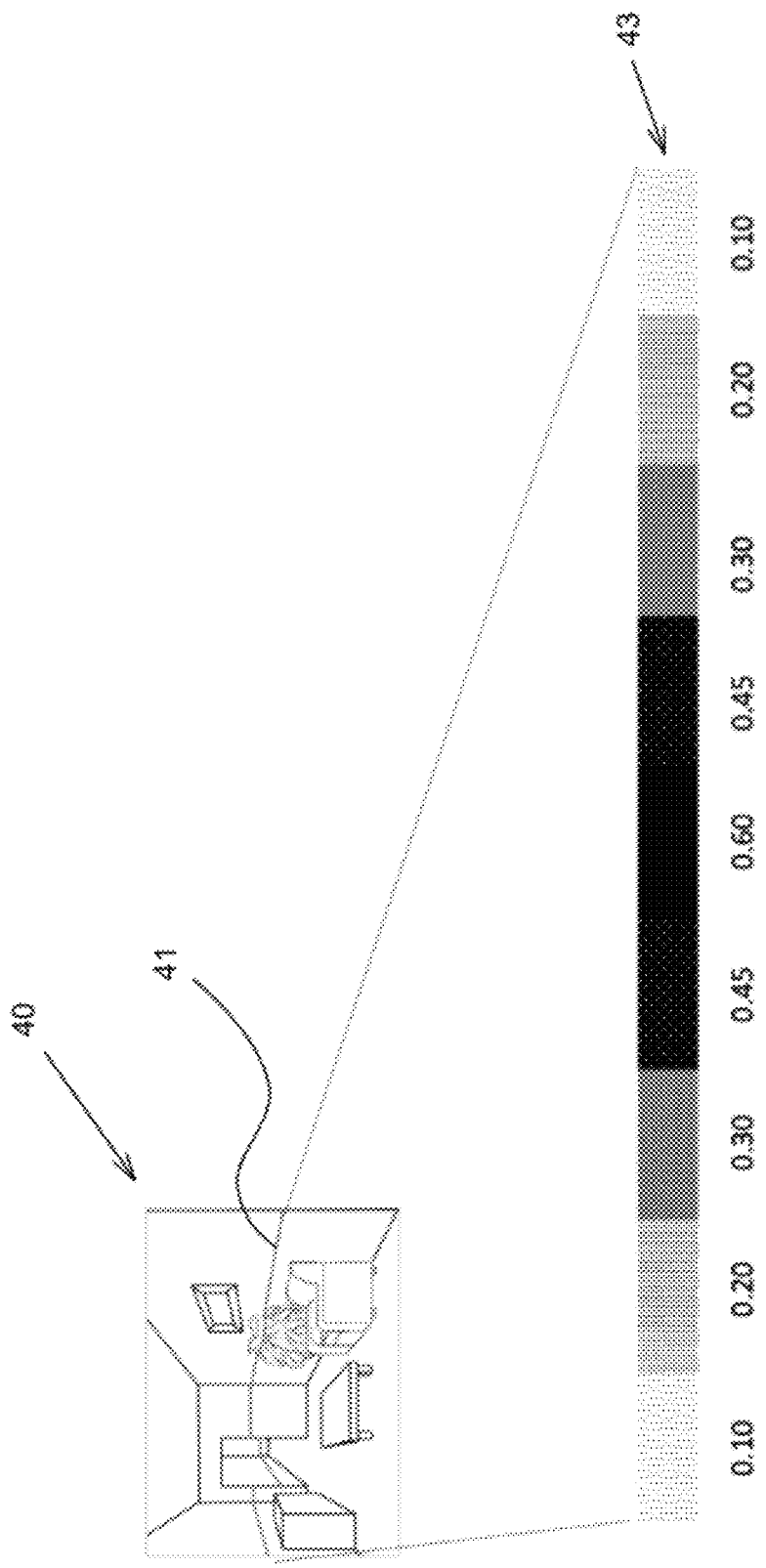

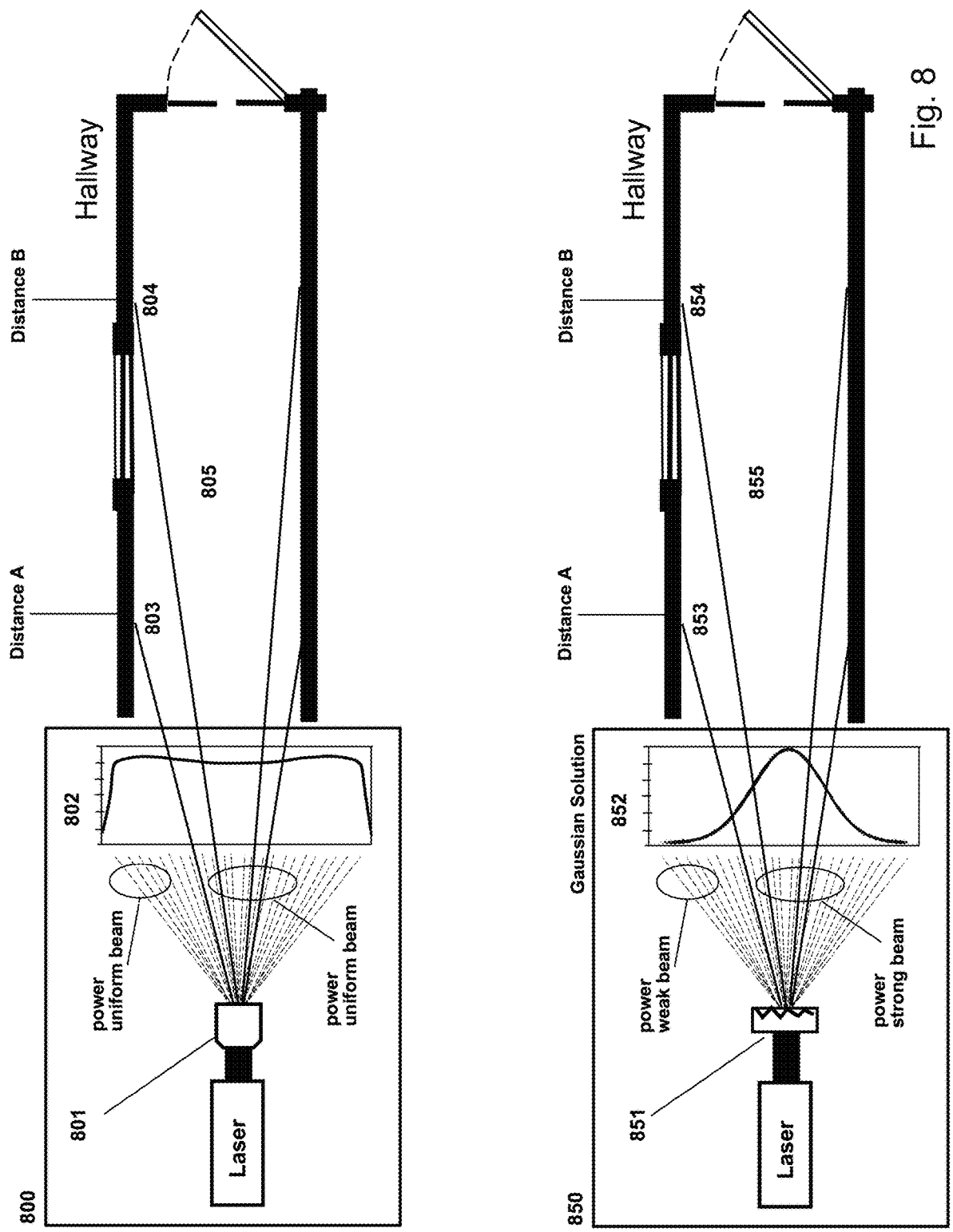

10,962,792 B2

LASER LIGHT STRIPING APPARATUS

FIELD OF THE INVENTION

The invention relates to a laser light striping apparatus suitable for distance navigation during fire rescue, which laser light striping apparatus comprises at least a laser light emitting element and at least one optical element for creating at least one laser light plane extending on two sides of an optical axis of said optical element.

BACKGROUND OF THE INVENTION

Such a laser light striping apparatus is known from U.S. Pat. No. 8,672,513. The apparatus provides a means for a fireman to navigate a room, corridor, fire escape route, other enclosed infrastructure using laser light as a technique to penetrate smoke/fire and darkness to provide hints to navigation of doorways and object structures optimized for long distance penetration for turbid environments.

Fire rescue in most cases is the process of walking through smoke filled areas with no light as electrical power has failed or cut off for safety. The process is dangerous as there may be holes in the floor or obstacles in the area or simply unknown navigation. Coherent light emitted by a laser can penetrate smoke areas without the blinding reflection of commonly used light sources and can be used to demarcate objects and structures for hints in navigation as well as providing a distinguished source of lighting.

The laser light plane produces a line stripe pattern on a wall extending perpendicular to the optical axis with an even distribution of power along the stripe line pattern. Use of an even distribution for navigation of 10 meters requires a laser light emitting element with a relatively high power. Such high power is undesirable since it would require relatively large batteries which need to be carried by the fireman and extensive cooling of the laser light emitting elements.

Furthermore the operation would be unsafe to individuals at closer range using more laser power to achieve greater distance.

SUMMARY OF THE INVENTION

At least one of the objects of the invention to provide a laser light striping apparatus whereby a line stripe pattern provides effective demarcation of objects and deep penetration of an area for hints in navigation, with a relatively low power laser light emitting element.

This object is accomplished with the laser light striping apparatus according to the invention in that the laser light plane extends over a fan angle between 85 to 120 degrees, wherein over a line pattern in said laser light plane extending perpendicular to the optical axis, the emitted laser light line strip has a Gaussian distribution of power.

Due to the Gaussian distribution of power an effective demarcation of objects and deep penetration of an area especially along the optical axis of the optical element for hints in navigation is obtained. The further away from the optical axis, the less laser light is being used. In this way navigation marking as well as efficient power usage of a laser for mobility is optimized and therefore reduces thermal cooling requirements while providing a safe environment for humans.

The light striping provides navigation for long distance without the blinding reflection results of using conventional spatial light systems.

An embodiment of the laser light striping apparatus according to the invention is characterized in that the optical element comprises a diffraction optical element.

Such diffraction optical element like a diffraction grating has a periodic structure, which splits, diffracts, and controls amount of light power of beams aligning into a line pattern. The directions of these beams depend on the spacing of the grating and the wavelength of the light so that the grating acts as the dispersive element while miniaturized structures within to throttle the amount of power for each beam.

Another embodiment of the laser light striping apparatus according to the invention is characterized in that the Gaussian distribution of power f(x) over the line pattern is $$f(x) = \frac{1}{\sigma\sqrt{2\pi}} e^{-x^2/(2\sigma^2)}$$

wherein x ranges at least from −1.4 to 1.4, preferably from −1.2 to 1.2 and sigma σ is between 0.5 and 2, preferably between 0.6 and 1.7, more preferably between 0.7 and 1.5 and even more preferably about 1.

With such Gaussian distribution of power a good illumination over the desired fan angle is obtained with a relatively useful safe power along the optical axis.

BRIEF DESCRIPTION OF THE DRAWINGS

The laser light striping apparatus according to the invention will further be explained with reference to the drawings, wherein, FIGS. 7A-7E are perspective views of a room showing different line patterns projected on different locations of walls, objects and persons in the room.

FIG. 8 showing uniform line distribution of power verses the gaussian distribution of power for providing light striping over a distance.

In the drawings, like reference numerals refer to like element.

DETAIL DESCRIPTIONS OF THE INVENTION

Figure 1A:
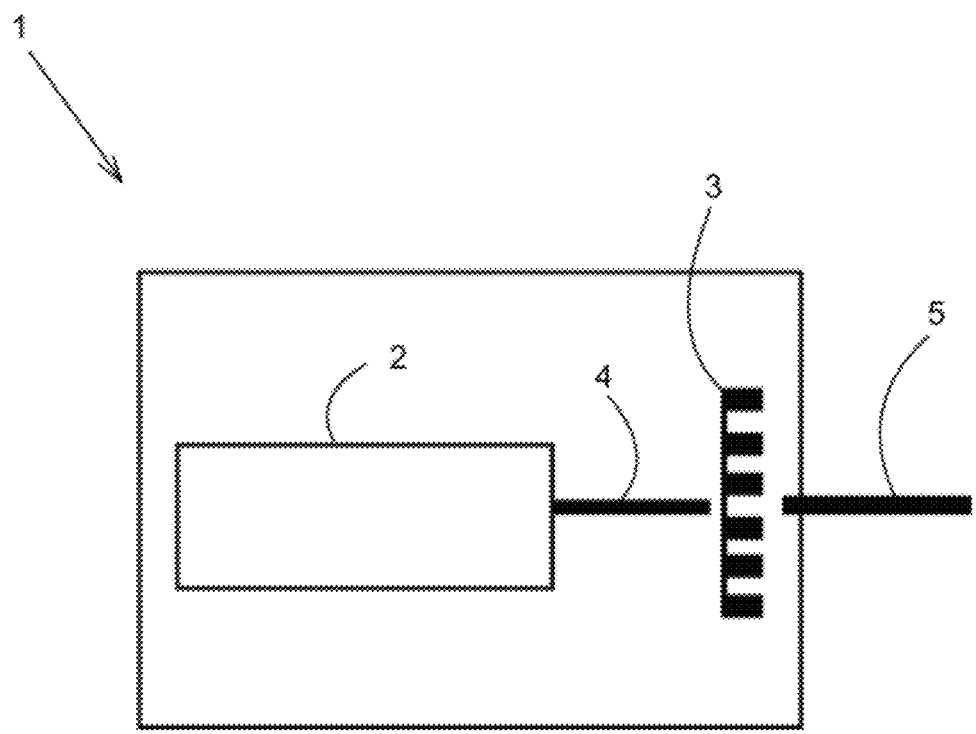
FIGS. 1A and 1B are a side view and top view respectively of a laser light striping apparatus according to the invention.
Figure 1B:
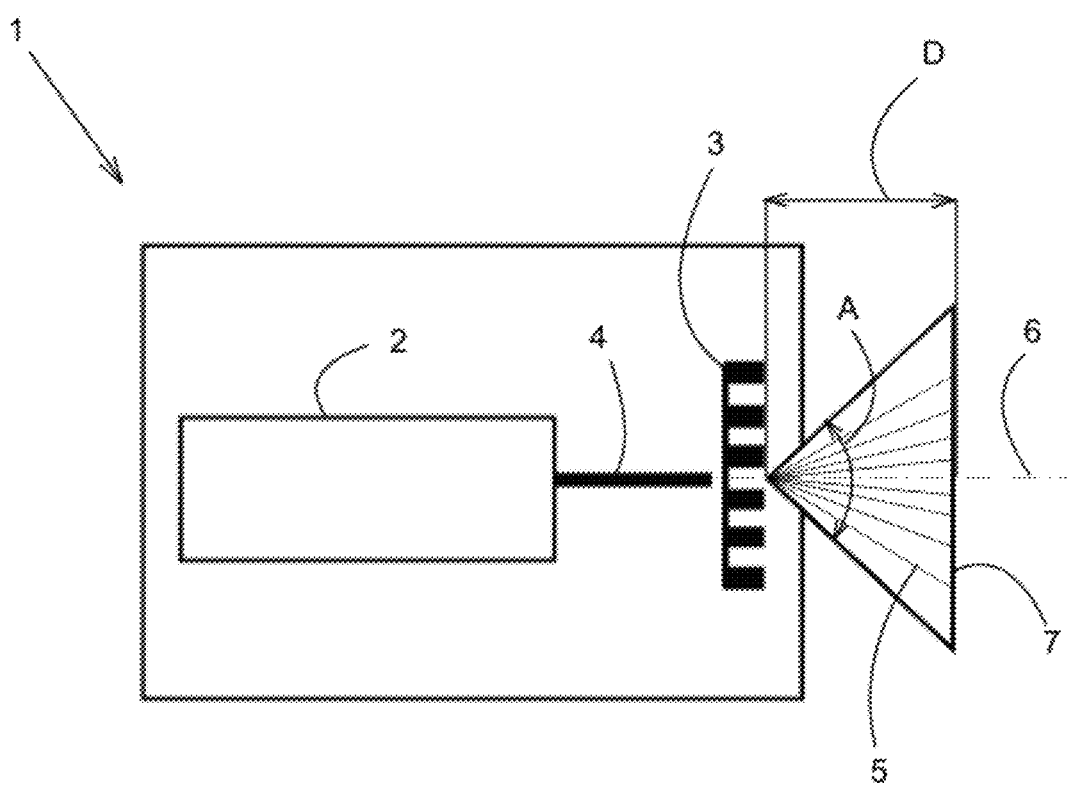

FIGS. 1A and 1B show a side view and top view respectively of a laser light striping apparatus 1 according to the invention. The laser light striping apparatus 1 comprises a laser light emitting element provided with a laser diode 2 and an optical element provided with a diffraction optical element 3. Referring to FIG. 1B, the laser diode 2 produces a coherent laser beam 4 to be incident with the diffraction optical element 3. The diffraction optical element 3 has a periodic structure, which splits, diffracts, and controls amount of light power of beams aligning into a laser light plane 5. In the enclosed embodiment the laser light plane extends symmetrically on two sides of an optical axis 6 of the design of the diffraction optical element 3. The directions of the beams in the laser light plane 5 depend on the spacing of the diffraction optical element 3 and the wavelength of the light so that the diffraction optical element 3 acts as the dispersive element while miniaturized structures within throttle the amount of power for each beam in the laser light plane 5. The laser light plane 5 extends over a fan angle A being between 85 to 120 degrees line pattern 7 in said laser light plane 5 extends perpendicular to the optical axis 6. Over the line pattern 7, the emitted laser light has a Gaussian distribution of power f(x) of $$f(x) = \frac{1}{\sigma\sqrt{2\pi}} e^{-x^2/(2\sigma^2)}$$

wherein x ranges at least from −1.4 to 1.4, preferably from −1.2 to 1.2 and sigma σ is between 0.5 and 2, preferably between 0.6 and 1.7 and more preferably about 1. The actual power on the line pattern 7 depends on the Gaussian distribution of power f(x) as well as on the distance D between the diffraction optical element 3 and the line pattern 7.

The laser diode 2 produces a green (532 nm) or blue (445-475 nm) light as it will contrast with fire lit areas to distinguish the light source and be more visible. Scotopic vision (eye under low light condition) is stronger for blue to green light and therefore also more visible.

Figure 2:
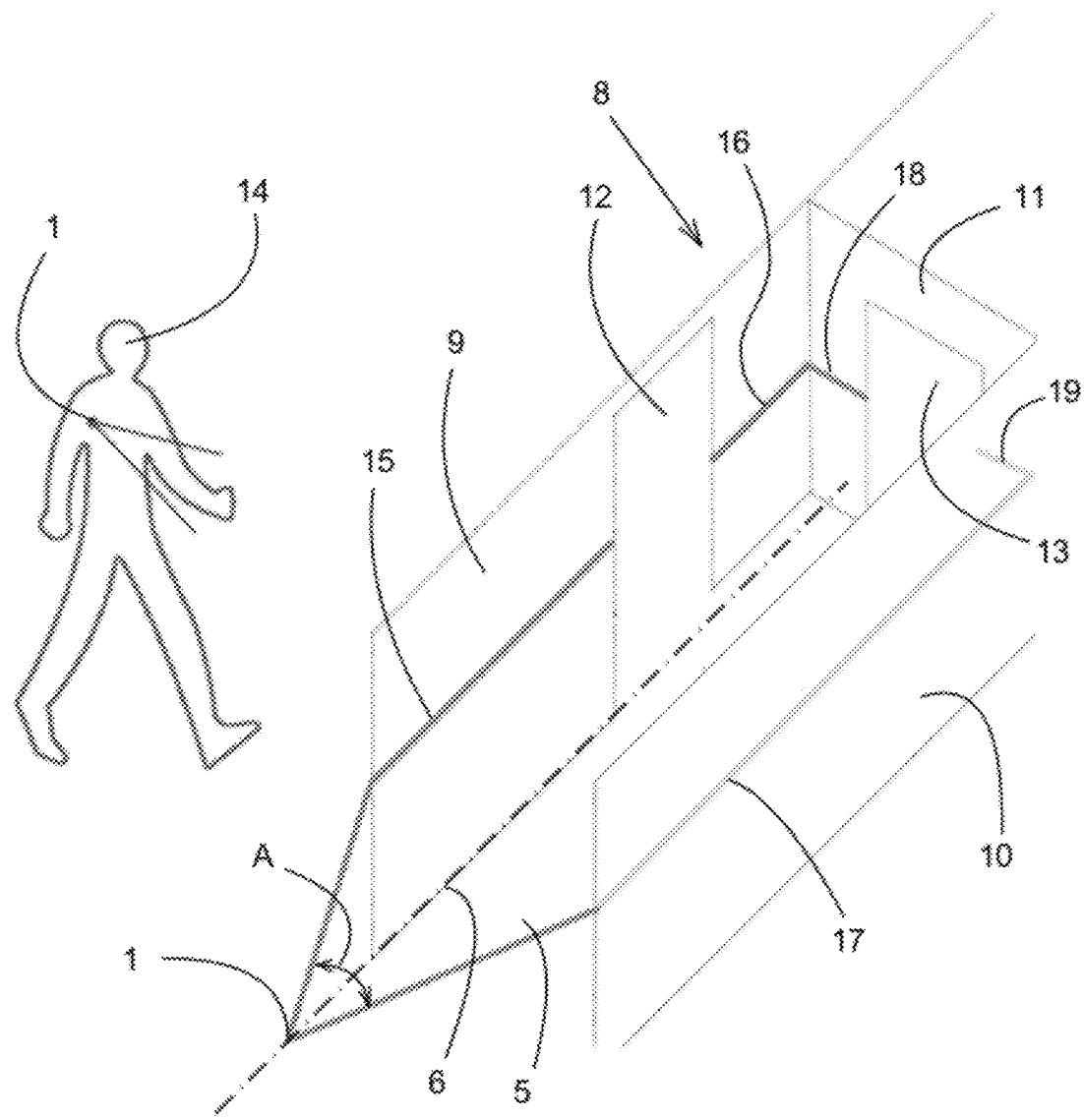
FIG. 2 is a perspective view of the laser light striping apparatus as shown in FIGS. 1A and 1B as used by a fire rescuer and as seen by the fire rescuer.

FIG. 2 is a perspective view of a hallway 8 defined by two parallel walls 9, 10 and an end wall 11. Wall 9 is provided with a doorway 12. End wall 11 is provided with a doorway exit 13. A fire rescuer 14 is wearing the laser light striping apparatus 1 on his chest. When the fire rescuer 14 walks in the hallway the switched on laser light striping apparatus 1 casts the laser light plane 5 in the hallway 8 and onto the walls 9, 10, 11 as line patterns 15, 16, 17, 18, 19. On the doorway 12 and the doorway exit 13, the line pattern 15, 16; 18, 19 is being interrupted and the fire rescuer 14 is visually queued with a broken line indicating that a doorway 12 is present in the 15 wall 9 and a doorway exit 13 is present in the end wall 11.

Figure 3:
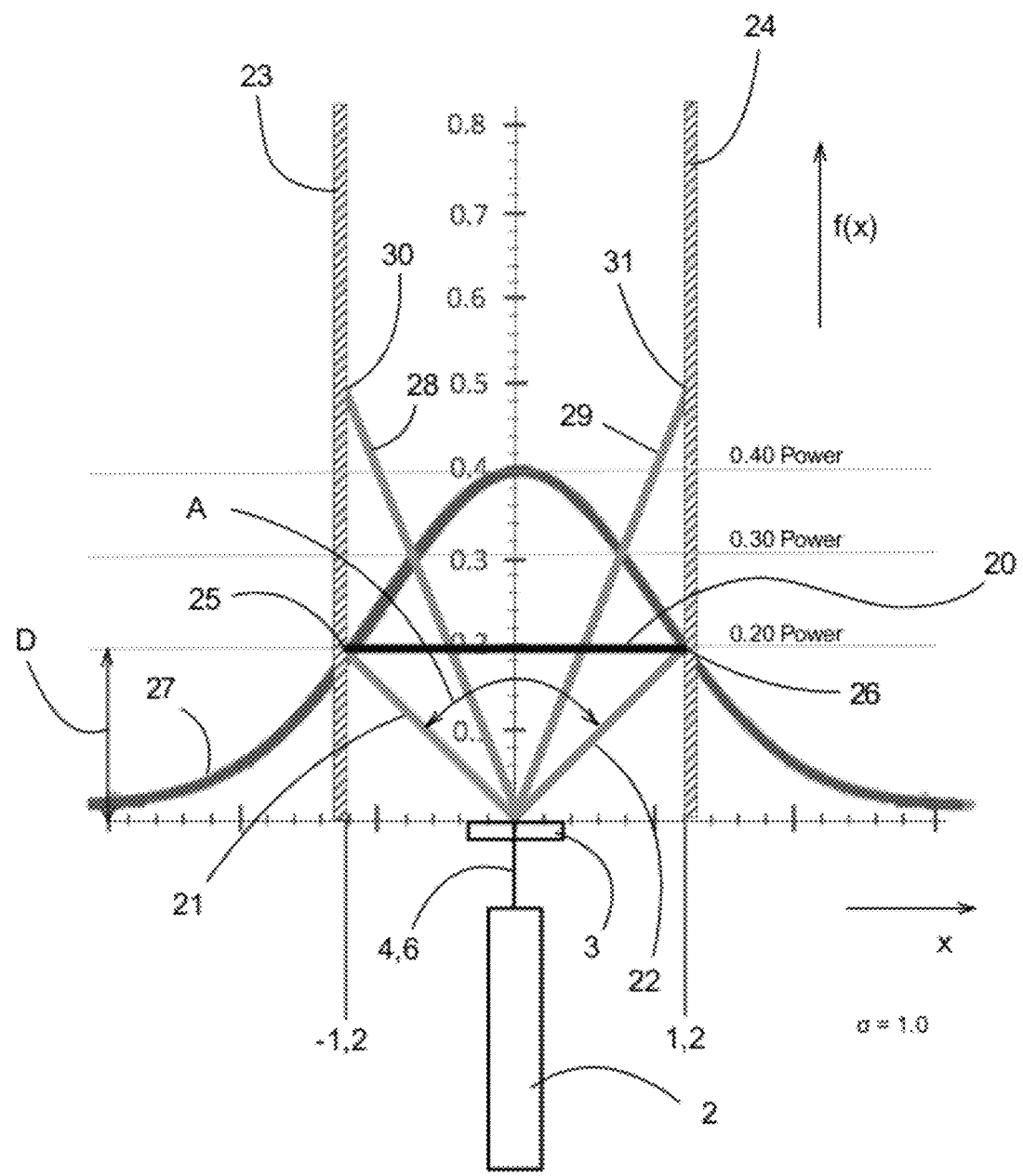
FIG. 3 is a diagram showing the Gaussian distribution of power over a line pattern with a first value of sigma.

FIG. 3 is a diagram showing the Gaussian distribution of power over a line pattern 20 extending perpendicular to the optical axis 6 with x ranging from −1.2 to 1.2 and sigma σ is 1. The fan angle A is 120 degrees. Laser light beams 21, 22 hit parallel walls 23, 24 at positions 25, 26. The Gaussian distribution of power over the line pattern 20 extending between the positions 25, 26 is shown by overlaid graph 27. The laser light beams 21, 22 have a power of 0.2 units, the laser light beams 28, 29 hitting the parallel walls 23, 24 at positions 30, 31 have a power of 0.3 units on the line pattern 20 and the central laser light beam (not shown) extending along the optical axis 6 has a power of 0.4 units on the line pattern 20. The real values of the power in Watt depends on the power of the laser diode 2 and the distance D between the line pattern 20 and the diffraction optical element 3.

These units can be mapped to relative laser power such as 2 mw per 0.1 unit. When the same laser diode 2 would have been used to provide a uniform distribution, the maximum power would be 0.2 units. A good ratio of the power at the center and the power at the positions 25, 26 is 2:1 with σ being 1.0.

Figure 4:
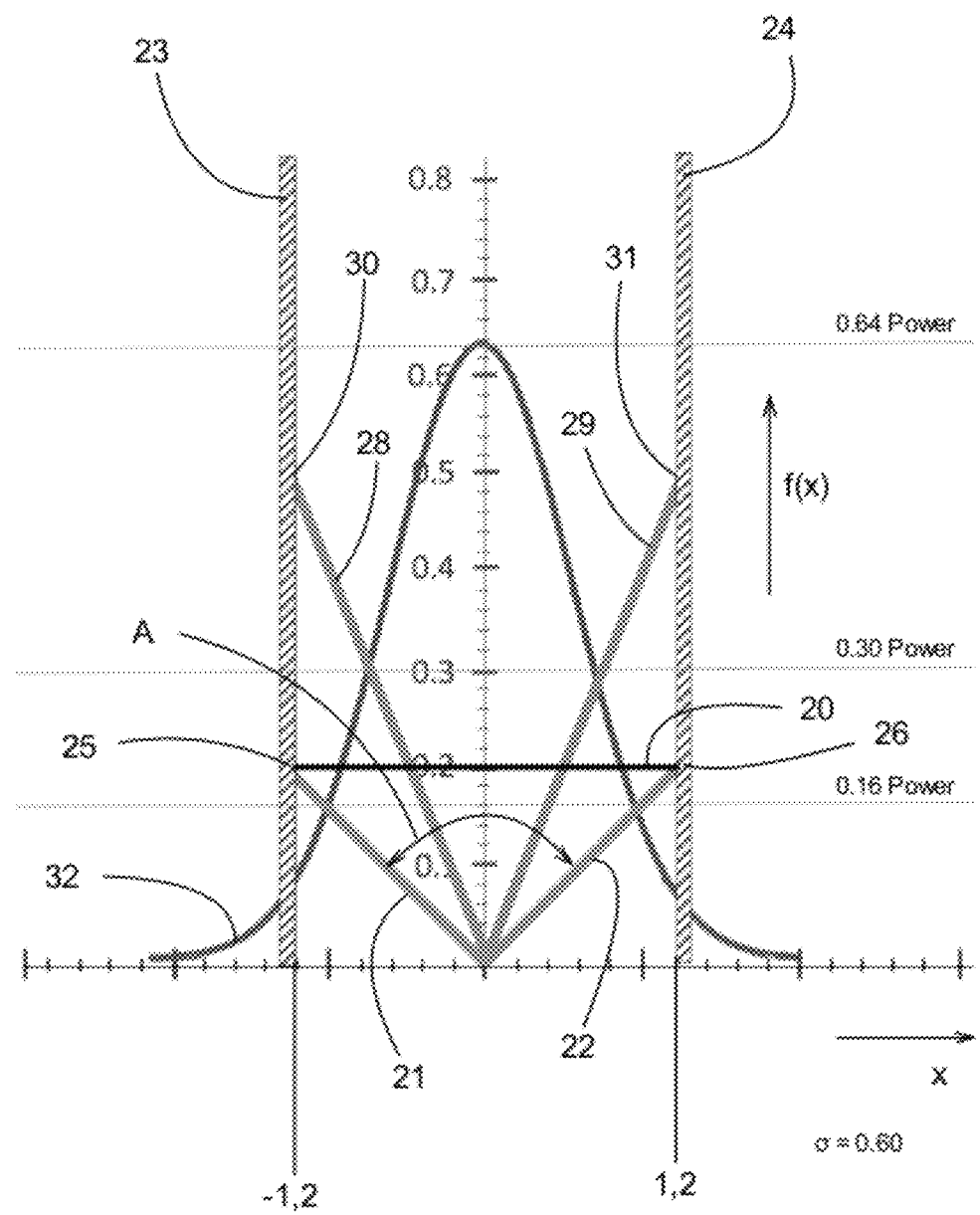
FIG. 4 is a diagram showing the Gaussian distribution of power over a line pattern with a second value of sigma.

FIG. 4 shows a similar diagram as shown in FIG. 3, whereby sigma σ is 0.6 instead of 1. The Gaussian distribution of power over the line pattern 20 extending between the positions 25, 26 is shown by graph 32. The outer light beams 21, 22 have a power of 0.16 units, the light beams 28, 29 have a power of 0.30 units whilst the central laser light beam (not shown) extending along the optical axis 6 has a power of 0.64 units, all on the line pattern 20.

Figure 5:
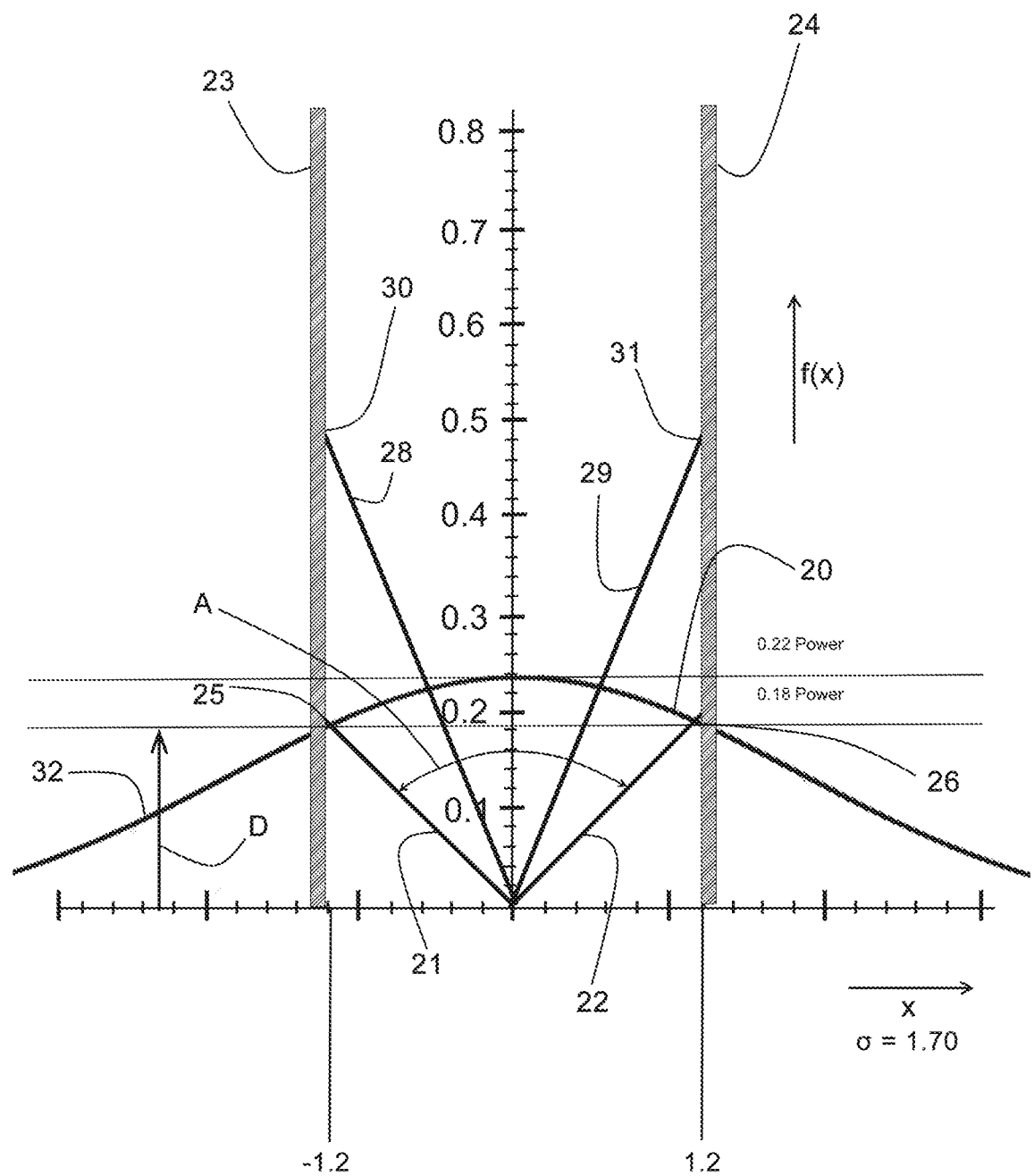
FIG. 5 is a diagram showing the Gaussian distribution of power over a line pattern with a third value of sigma, FIGS. 6A and 6B showing side view of a fire rescuer in two different positions wearing a laser light striping apparatus according to the invention.

FIG. 5 shows a similar diagram as shown in FIG. 3, whereby sigma σ is 1.7 instead of 1. The Gaussian distribution of power over the line pattern 20 extending between the positions 25, 26 is shown by graph 33. The outer light beams 21, 22 have a power of 0.18 units on the line pattern 20 whilst the central laser light beam (not shown) extending along the optical axis 6 has a power of 0.22 units.

As an example, when using a 280 mW, 450 nm laser diode 2 with a diffraction optical element 3 the laser power on the line pattern 20 at a distance D of 1000 mm would be 0.4 mW at the center and 0.2 mW on positions 25, 26. At a distance D of 100 mm the power at the center would be 3.7 mW and on the positions 25, 26 1.7 mW.

Referring to FIG. 5, in case of an even distribution of power, as by the prior art, the walls on both sides of the fire rescuer and being relatively close would be illuminated with laser beams having a certain power whilst the same power would be available at the same distance on the central laser beam needed to hit the remote end wall 11. So the walls being closer would be illuminated much brighter than the walls being further away, especially since more power is needed to go a longer distance through smoke.

With the laser light striping apparatus 1 according to the invention more power is available for walls or objects being hit by the central laser beam extending along the optical axis 6, whilst less power is available for walls and objects locate next to the fire rescuer 14.

Referring to FIG. 3, the use of a Gaussian distribution of power over the line pattern 20 provides the needed power to project a line at a longer distance to effectively mark walls at positions 30, 31 for demarcation and therefore providing navigation hints in combination with the fan angle A thereby optimizing efficient use of laser power for battery consumption and lower requirements for thermal management and safer laser for human coexistence. When sigma σ is less than 0.6 the center value of the Gaussian distribution of power is relatively high and dangerous for close proximity in its usage and realistic if there are no humans in the area to be seen by the fire rescuer navigating his way through. A sigma σ larger than 1.7 is essentially almost an even power distribution line.

Figure 6A:
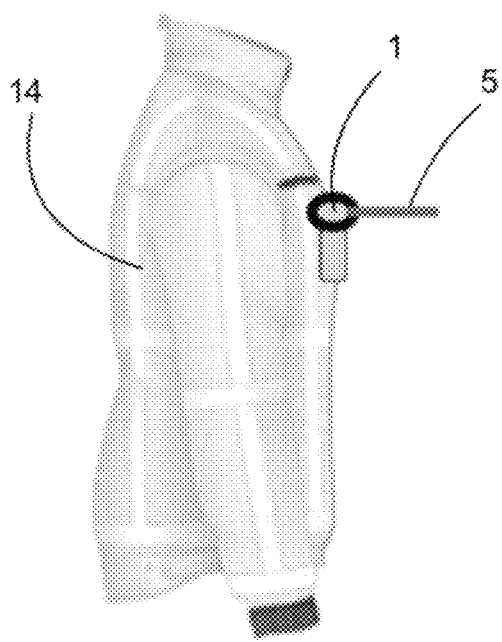
Figure 6B:
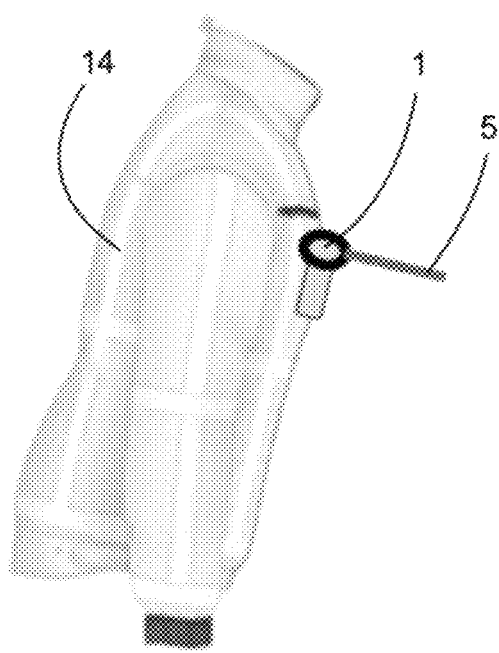

FIGS. 6A and 6B showing side view of a fire rescuer 14 in two different positions to illuminate the walls or floor respectively wearing a laser light striping apparatus 1 according to the invention.

Figure 7B:

FIGS. 7A-7E are perspective views of a room 40 showing different horizontal and vertical respectively line patterns 41, 42 projected on the walls, objects and persons in the room. In FIG. 7A the Gaussian distribution of power 43 is graphed whereby from loose to tight patterns forming colors gray to black represent laser light power from low to high, black is highest power, shown as well.

Figure 7C:
Figure 7D:
Figure 7E:
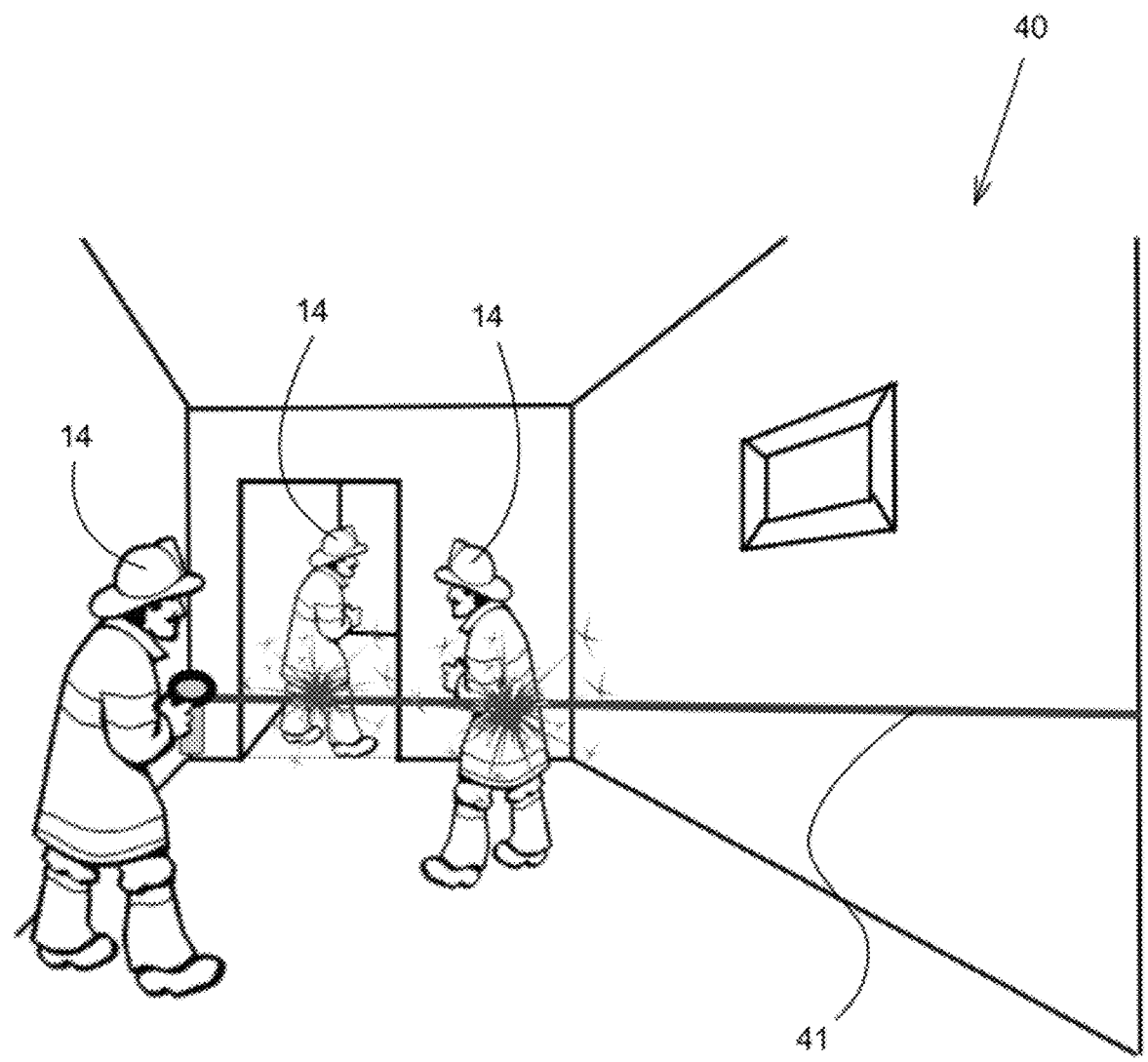

In the FIGS. 7A and 7B a horizontal line pattern 41 is shown at different levels, whilst in the FIGS. 7C and 7D a vertical line pattern 42 is shown at different positions. In FIG. 7E a situation is shown where another fire rescuer 14 wearing reflective clothing is being hit by a laser beam.

When the laser beam hits the reflective clothing it explodes in flash bursts of light to assist with locating other for rescuers.

Referring to FIG. 8, for completeness at 800 is a laser system which uses a powell lens at 801 to provide a uniform laser line distribution. At 802 is a graph of the power distribution of the system 800 for a laser line. At 805 is a room which has a turbid environment, at 803 is a strike zone for the laser line produced by the system 800. At 804 is a greater distance strike zone for the laser line produced by the system 800. At 804 requires more power from system 800 through a turbid environment at 805 to strike with a laser line to pierce the turbid environment. At 850 is implementation of the invention, a laser system which uses an optical element to produce a gaussian distribution of power to provide a laser line. At 855 is a room which has a turbid environment, at 853 is a strike zone for the laser line produced by the system 850. At 854 is a greater distance strike zone for the laser line produced by the system 850. At 854 the system 850 provides enough power through a gaussian design of power distribution through a turbid environment at 855 to strike with a laser line to pierce the turbid environment.

What is claimed is:

1. Laser light striping apparatus suitable for distance navigation during fire rescue comprising:
    a laser light source;
    the light source generating a laser light plane over a fan angle of 85 to 120 degrees;
    the laser line from the light plane having a power intensity distribution characterized by a Gaussian power f(x)

$$f(x) = \frac{1}{\sigma\sqrt{2\pi}} e^{-X^2/(2\sigma^2)}$$

wherein x ranges at least from −1.4 to 1.4 and sigma σ is between 0.6 and 1.5.

2. Laser light striping apparatus according to claim 1, characterized in that the optical element comprises a diffraction optical element.

3. Laser light striping apparatus according to claim 1 wherein the light source plane is used to view the smoke pattern.

* * * * *